Aug. 26, 1952     W. E. HUEBNER     2,608,361
ANCHORING DEVICE FOR DECOYS
Filed March 22, 1948     2 SHEETS—SHEET 1
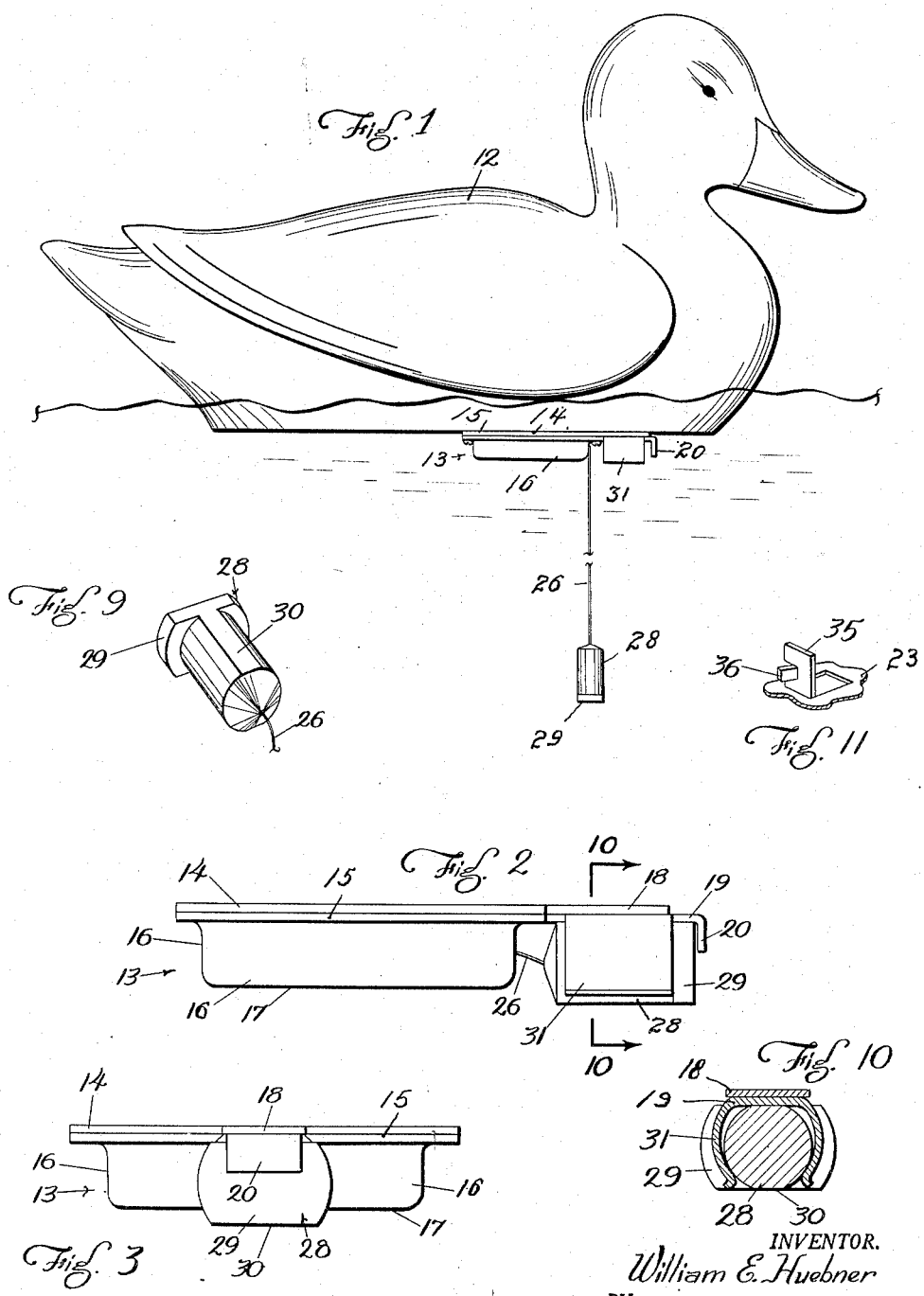

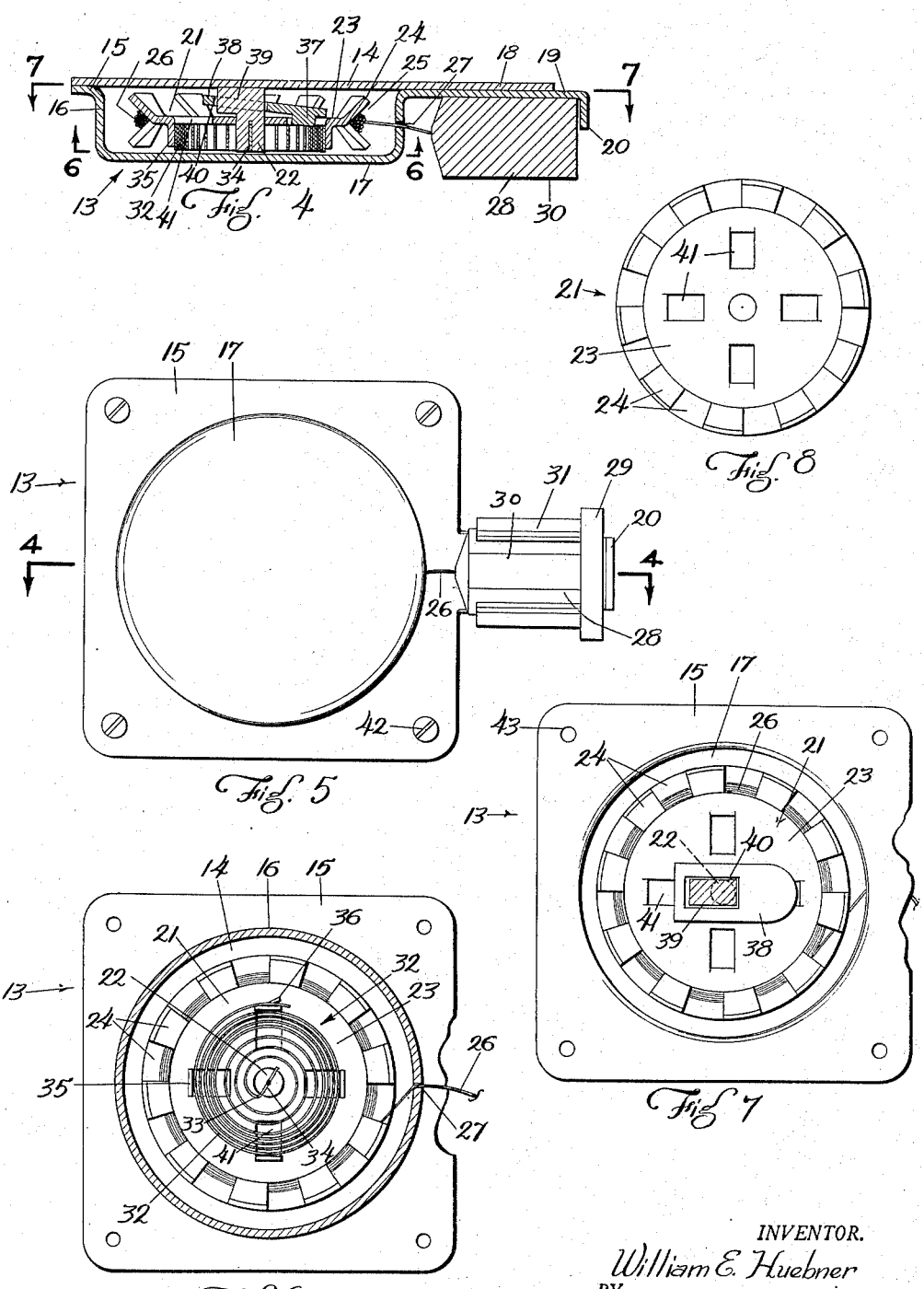

Patented Aug. 26, 1952

2,608,361

UNITED STATES PATENT OFFICE 2,608,361

ANCHORING DEVICE FOR DECOYS

William E. Huebner, Minneapolis, Minn.

Application March 22, 1948, Serial No. 16,225

2 Claims. (Cl. 242—107)

My invention relates to improvements in decoy anchoring devices.

An object of this invention is to provide a highly efficient decoy anchoring device including a housing applicable to the under side of a conventional decoy without insetting or otherwise changing the same.

A further object of this invention is to provide a waterproof housing applicable to the under side of a conventional decoy and containing a spring-actuated reel on which is wound one end portion of a cord attached to a weight.

Another object of this invention is to provide novel means actuated by bodily movements of the decoy for controlling the spring-actuated reel.

Other objects of this invention will be apparent from the following description and accompanying drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is an elevational view of a conventional duck decoy having the improved anchoring device attached thereto;

Fig. 2 is a view of the anchoring device in side elevation, on an enlarged scale, removed from the decoy and showing the anchor held by a clip on the housing;

Fig. 3 is a front elevational view of the anchoring device, as shown in Fig. 2;

Fig. 4 is a view in central longitudinal section taken on the line 4—4 of Fig. 5;

Fig. 5 is a bottom plan view of the anchoring device shown in Fig. 4;

Fig. 6 is a view partly in bottom plan and partly in section taken on the line 6—6 of Fig. 4;

Fig. 7 is a view with the top plate of the housing removed and the pivot stud and dog sectioned on the line 7—7 of Fig. 4;

Fig. 8 is a plan view of the reel removed from the housing;

Fig. 9 is a perspective view of the weight;

Fig. 10 is a detail view in section taken on the line 10—10 of Fig. 2; and

Fig. 11 is a fragmentary detail showing a portion of the reel and the spring anchor thereon.

The numeral 12 indicates a conventional duck decoy to which the improved anchoring device is attached.

The anchoring device includes an annular housing 13 comprising a rectangular cover plate 14, a correspondingly formed top plate 15, the central portion of which is depressed to form the annular side wall 16 of the housing 13 and the bottom member 17 thereof. The cover plate 13 and the top plate 15 are each provided with a relatively narrow extension 18 and 19, respectively. Both the cover plate 14 and the top plate 15 rest the one upon the other and are connected by a watertight joint. On the outer end of the top plate extension 19 is a downturned flange 20.

Within the housing 13 is a reel 21 turnably mounted on a pivot stud 22 rigidly secured to the cover plate 14 at the axis of said housing. The body 23 of the reel 21 is a flat disk, the peripheral portion of which is radially cut and the sections 24 therebetween are alternately turned obliquely outwardly on opposite sides of the body 23 to form a peripheral V groove 25 in the reel 21.

A cord 26 that is waterproofed or made of waterproof material is wound on the V groove 25 and its outer end portion is threaded through a small hole 27 in the housing wall 16 on a radial line that extends from the axis of the housing 13 to the transverse center of the top plate extension 19.

A round elongated weight 28 is attached to the outer end portion of the cord 26 and has a base 29 of enlarged diameter. Opposite sides of the weight 28 and base 29 are flattened, as indicated at 30. When not in use, the weight 28 is placed flatwise on the top plate 15 and releasably held by a pair of spring jaws 31 integral with the longitudinal edges of the top plate. The weight 28 is held against endwise removal from the jaws 31 by the housing wall 16 and the flange 20.

The reel 21 is roated to wind the cord 26 in the V groove 25 by a clock spring 32 surrounding the pivot stud 22. This spring 32 has its inner end portion anchored to the pivot stud 22 by bending the same radially inwardly at 33 and inserting the same through a transverse slot 34 in the free end of said screw stud, see Fig. 6. The expansion of the spring 32 is limited by a plurality of depending lugs 35 cut and pressed from the reel body 23. The spring 32 has its outer end portion detachably secured to one of the lugs 35 by cutting and pressing a hook-acting prong 36 from said lug and forming an aperture in the spring 32 through which said lug extends.

Turning of the reel 21 on the pivot stud 22 is controlled by a detent 37 on a floating plate 38 on the pivot stud 22 between the top plate 15 and the reel body 23. The pivot stud 22 has a rectangular base 39 that extends loosely through a correspondingly formed aperture 40 in the floating plate 38. Formed in the reel body 23 is a plurality of rectangular apertures 41 that are circumferentially spaced about the pivot stud 22, with any one of which the detent interlocks. To release the detent 37 from the aperture 40 into which it extends, the decoy 12 is turned upside down to permit the floating plate 38 to drop by the force of gravity and thus withdraw said detent from the respective aperture 40.

With the decoy 12 in an inverted position, the cord 26 may be unwound from the reel 21 by pulling outwardly upon the same, to position the weight the desired distance from the decoy 12 depending on the depth of water on which the decoy 12 floats. When the desired amount of cord 26 has been unwound from the reel 21, the decoy 12 is turned right side up and at which time the floating plate 38 drops by the force of gravity and positions the detent 37 on the reel body 23 and by putting a small amount of slack in the cord 26, the detent 37 will drop into the next following aperture 40 and thus lock the reel 21 relative to the housing 13.

By holding the cord 26 or the weight 28, the speed at which the reel 21 rotates to wind the cord 26 thereon may be varied, at will. The cord 26 substantially fills the hole 27 in the housing wall 16 and thus prevents ingress of water.

The housing 13 is detachably secured to the decoy 12 on the under side thereof by screws 42 that extend through holes 43 in the four corner portions of the two plates 14 and 15 and have threaded engagement with the decoy 12.

The drawings illustrate a commercial form of the invention, but it will be understood that the same is capable of certain modifications as to details of construction, arrangement and combination of parts within the scope of the invention herein disclosed.

What I claim is:

1. A decoy, a housing secured on the bottom of the decoy, a fixed vertical pivot stud extending into the housing, a spring-actuated reel mounted on the pivot stud to turn in a horizontal plane and having an aperture, a cord wound on the reel and extending outwardly through a hole in the housing, and a member between the decoy and the reel and attached to said reel to turn therewith but free for movement in a vertical plane, normally said member is projected into the aperture in the reel by the force of gravity and holds said reel from turning, said member when the decoy is inverted will be withdrawn from the aperture by the force of gravity and releases the reel.

2. A decoy, a housing secured on the bottom of the decoy, a fixed depending pivot stud extending into the housing, a spring-actuated reel mounted on the pivot stud to turn in a horizontal plane and having an eccentric transverse aperture, a cord wound on the reel and extending outwardly through a hole in the housing, said pivot stud having above the reel a rectangular base, a plate having a rectangular opening in one of its end portions through which the base extends and holds the plate from relative turning movement but free to tilt in a vertical plane, said plate having on the under side of its other end portion a detent projected into the aperture, to hold the reel from turning, by the tilting of the plate relative to the pivot stud due to preponderance of weight of the detent and the respective end portion of the plate, said detent being withdrawn from the aperture by inverting the decoy to reversely tilt the plate.

WILLIAM E. HUEBNER.

REFERENCES CITED

The following references are of record in the file of this patent:

UNITED STATES PATENTS

| Number | Name | Date |
| --- | --- | --- |
| 974,477 | Day | Nov. 1, 1910 |
| 999,641 | Fuerst | Aug. 1, 1911 |
| 1,024,434 | Bishop | Apr. 23, 1912 |
| 1,208,424 | Wedell | Dec. 12, 1916 |
| 1,443,194 | Pichler | Jan. 23, 1923 |
| 1,468,780 | Fraser | Sept. 25, 1923 |
| 1,789,649 | Gazecki et al. | Jan. 20, 1931 |
| 1,967,902 | Reichel | July 24, 1934 |

FOREIGN PATENTS

| Number | Country | Date |
| --- | --- | --- |
| 750,124 | France | May 22, 1933 |